United States Patent [19]

Ferrill et al.

[11] Patent Number: 4,986,779
[45] Date of Patent: Jan. 22, 1991

[54] LOCAL AREA NETWORK INTERFACE

[75] Inventors: Jess B. Ferrill, Madison; Randy G. Simmons, Clemmons, both of N.C.

[73] Assignee: AMP Incorporated, Harrisburg, Pa.

[21] Appl. No.: 475,620

[22] Filed: Feb. 6, 1990

[51] Int. Cl.$^5$ .............................................. H01R 4/66
[52] U.S. Cl. .................................. 439/108; 439/535; 439/931; 439/96; 439/610
[58] Field of Search ...................... 439/931, 86, 89, 91, 439/92, 95, 96, 101, 107, 108, 106, 567, 552–555, 607, 609, 610, 535, 536

[56] References Cited

U.S. PATENT DOCUMENTS

| | | | |
|---|---|---|---|
| 2,934,590 | 4/1960 | Thompson et al. | 439/535 |
| 3,185,760 | 5/1965 | Despard | 439/535 |
| 3,605,075 | 9/1971 | Stofkooper | 439/931 |
| 3,680,031 | 7/1972 | Schumacher | 439/95 |
| 3,697,025 | 10/1972 | Edwards | 439/555 |
| 4,046,449 | 9/1977 | Ranzanigo | 439/553 |
| 4,747,786 | 5/1988 | Hayashi | 439/95 |
| 4,756,695 | 7/1988 | Lane et al. | 439/76 |
| 4,906,201 | 3/1990 | Young et al. | 439/567 |

OTHER PUBLICATIONS

AMP Catalog 89–835.

*Primary Examiner*—David L. Pirlot
*Attorney, Agent, or Firm*—Bruce J. Wolstoncroft

[57] ABSTRACT

A local area network interface assembly includes an outlet box for receiving at least one connector assembly therein. The outlet box is profiled to receive from the rear thereof, an edge card connector, which is snap latachable into the outlet box. The connector assembly is mounted to an edge card which is profiled for receipt within the edge card connector. The outlet box is formed of a dielectric material which is plated over with a metallic plating. The outlet box includes two latch members along the sides which are bow shaped and have grounding surfaces thereon, which latch the outlet box in place to a panel, and simultaneously ground the box to the panel.

7 Claims, 12 Drawing Sheets

LOCAL AREA NETWORK INTERFACE

BACKGROUND OF THE INVENTION

1. Field of the Invention

The subject invention relates to an interface for a local area network connection system and more particularly to a plated junction box for the interface which includes flexible and resilient plated spring arms to ground the plated junction box to a metallic panel.

2. Description of the Prior Art

U.S. Pat. No. 4,756,695 discloses an interface for a local area network. This assembly includes a wall box for receiving connectors therein, interconnectable to edge card connectors, which are inserted from the rear. In the '695 patent, the wall box is plated to effect a shielding for EMI/RFI. In the commercial embodiment of this connection system, two threaded inserts are included along the sidewalls which allow the box to be installed adjacent to a panel through hole, and snugged up against the back side of the panel, such that the plated box is grounded to the metallic panel. While the above mentioned connection system is quite advantageous, the need has arisen for a self locking, self grounding system, which is easier for the user to install in the panels.

It is an object of the invention to design a network interface outlet system which is easier for the user to install in the panels.

It is an object of the invention to design a network interface outlet system which has a grounding member which is elastic and has a large deflection range to accommodate various panel thicknesses.

SUMMARY OF THE INVENTION

The objects of the invention were accomplished by designing a local area network outlet receptacle assembly comprising an outlet means having at least one open compartment for receiving therein a connector for the network, the outlet means being a metallic plated dielectric material having integral latching means having a latching surface facing in a first direction. The outlet means also has an integral and at least one flexible plated grounding arm having a grounding surface which faces in the opposite direction as the first direction. In this manner, when the outlet means is located in a panel through hole, the panel is trapped between the latching surface and the grounding surface, and the outlet means is grounded to the panel.

In the preferred embodiment of the invention, two grounding arms extend from the side edges of the outlet means.

In the preferred embodiment of the invention, the grounding arms are bow shaped with the grounding surface mounted intermediate the bow.

In the preferred embodiment of the invention, the front and rear surfaces of the grounding arms are molded with a sinuous shape which allows the grounding arms to flex forwardly and rearwardly, yet prevents cracking of the metallic plating.

BRIEF DESCRIPTION OF THE DRAWINGS

FIG. 3 is a view similar to that of FIG. 2 showing a rear shield member exploded away from the plated junction box.

FIG. 13 is a rear plan view of the date interface assembly adapter insert.

DETAILED DESCRIPTION OF THE PREFERRED EMBODIMENT

Figure 1:
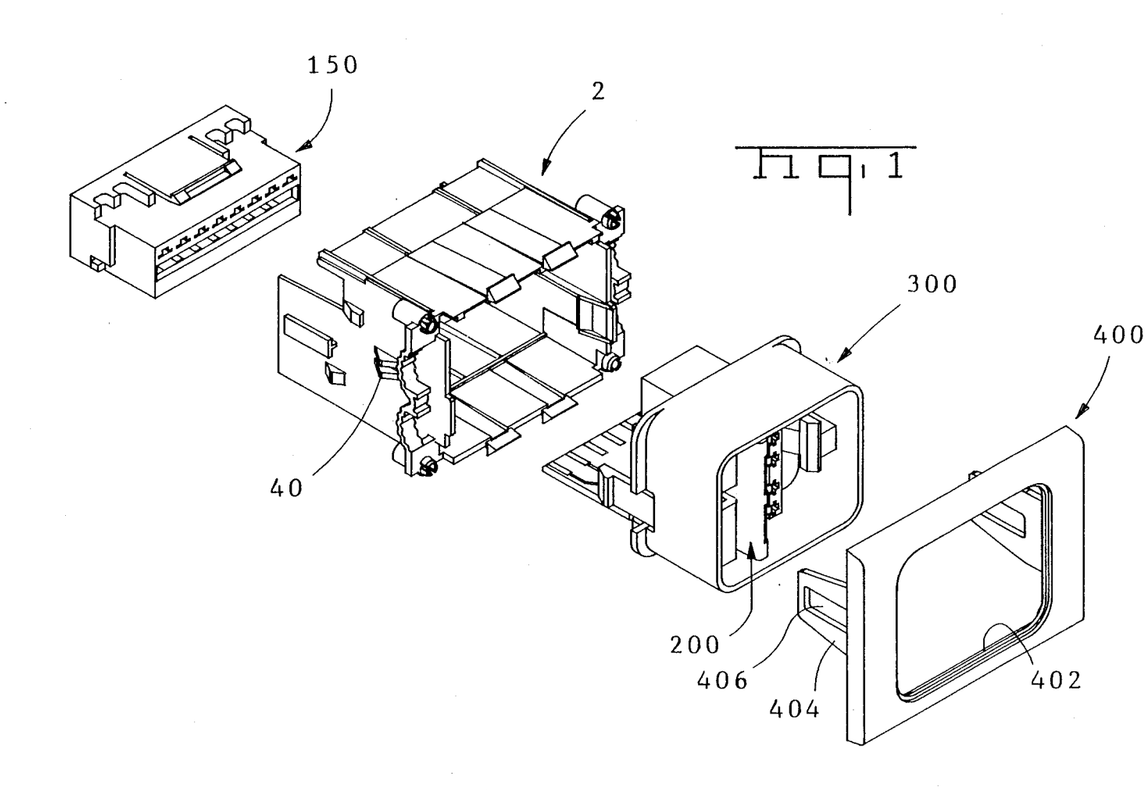
FIG. 1 is an isometric view of the components of the interface system exploded away from each other.
Figure 2:
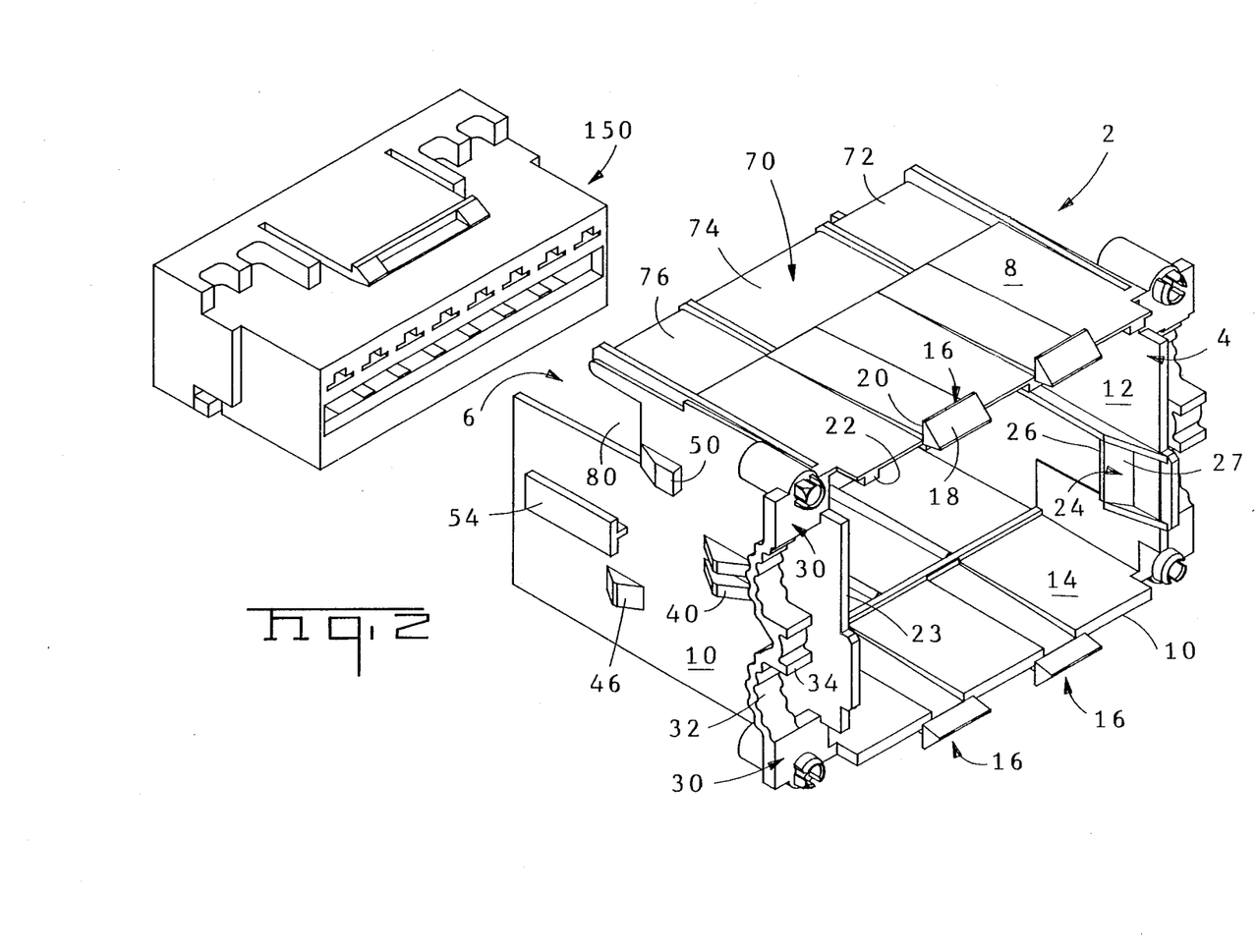
FIG. 2 is an enlarged view of the plated junction box and edge card connector.

With respect first to FIG. 1, the local area network interface includes a plated and shielded junction box 2, an edge card connector 150 which is insertable through the rear of the shielded junction box 2 and which receives through the front thereof a data connector assembly 200 which is latched to an adapter insert 300. A face plate 400 is then insertable over the adapter insert 300 and is snap latchable to the shielded junction box 2. With reference now to FIG. 2, the shielded junction box 2 will be described in greater detail.

The junction box 2 comprises a front mating face 4 and a rear connector receiving face 6. The junction box 2 is defined by a top wall 8, sidewalls 10 and 12 and a lower wall 14. Extending from the top and bottom walls 8 and 14 are latch members 16 comprising ramp surfaces 18 and rear latching surfaces 20. The front mating face 4 is defined by front edges 22 of the upper and lower walls 8 and 10 and front edges 23 of the sidewalls 10 and 12. On the internal surface of both sidewalls 10 and 12 is a latching structure 24 comprising a ramp surface 27 and a rear latching face 26.

Figure 4:
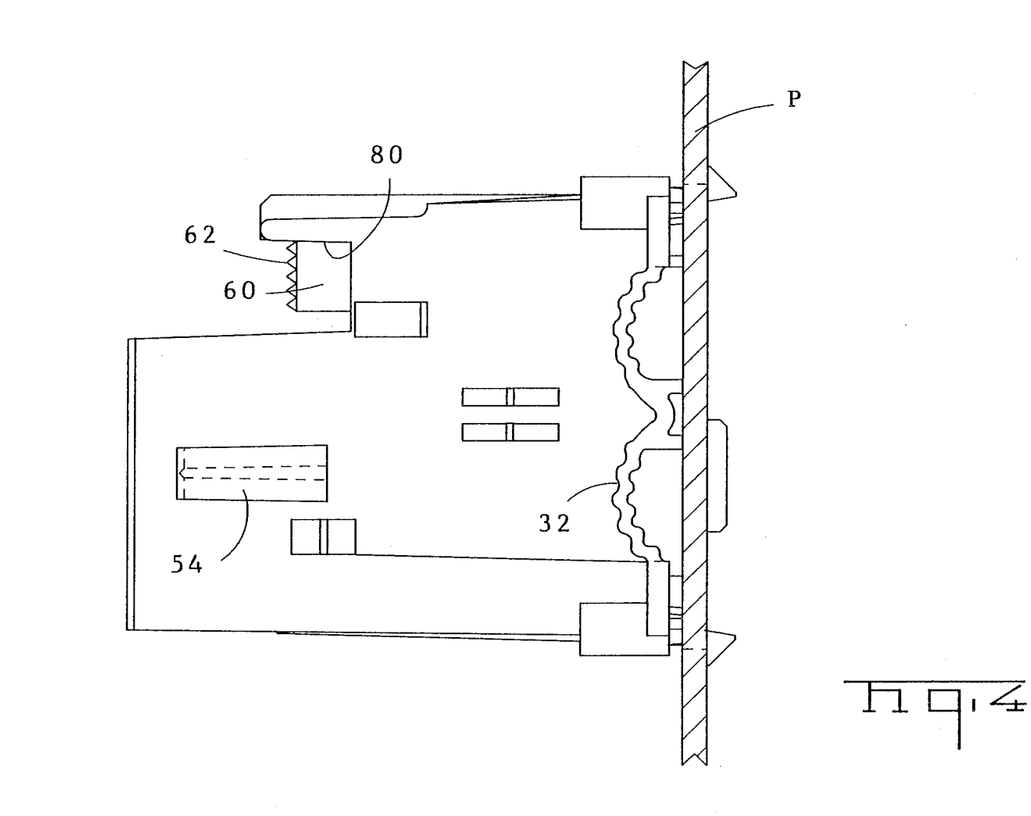
FIG. 4 is a side view showing the junction box in a snap latched configuration through a panel cut-out.

On the exterior of the sidewalls 10 and 12 are flanges 30 which include integral flexible arms 32 which include forwardly facing grounding stops 34 integral therewith. As best shown in FIG. 4, the flexible arms 32 are sinuous or corrugated in configuration which allows the resilient arms to flex without cracking the plating material which has been deposited on the resilient arms 32. The flexible arms and the plating thereof is in accordance with application Ser. No. 431,505 and with patent application Ser. No. 474,624, filed concurrently herewith. These sidewalls 10 and 12 further comprise latching members 40, 46 and 50, and a T-bar member 54 which will be described further herein. Towards the rear edge of the upper wall 8 is a rear ledge 70 having individual ledge surfaces 72, 74 and 76. As shown best in FIGS. 2 and 4, the ledge 70 extends over an opening 80 at each end, the opening 80 providing for side entry of a shielded cable from either direction.

Figure 5:
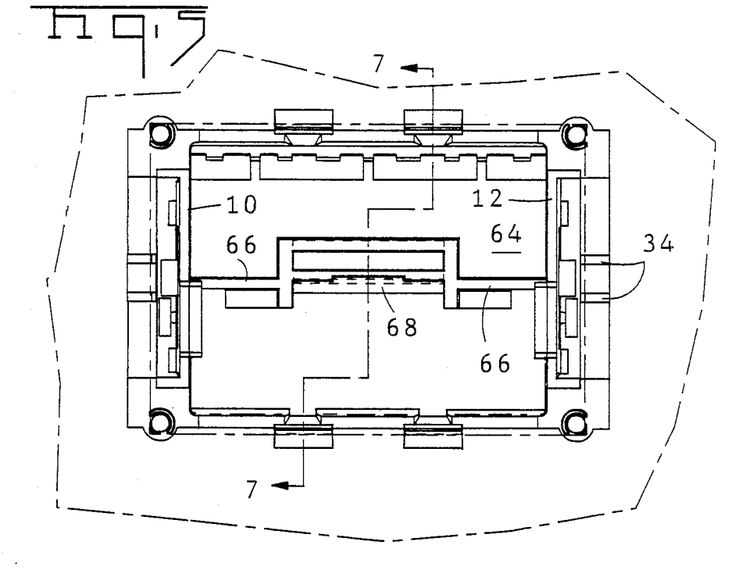
FIG. 5 is a front plan view of the shielded box of the instant invention showing the panel and its cut-out in phantom.
Figure 6:
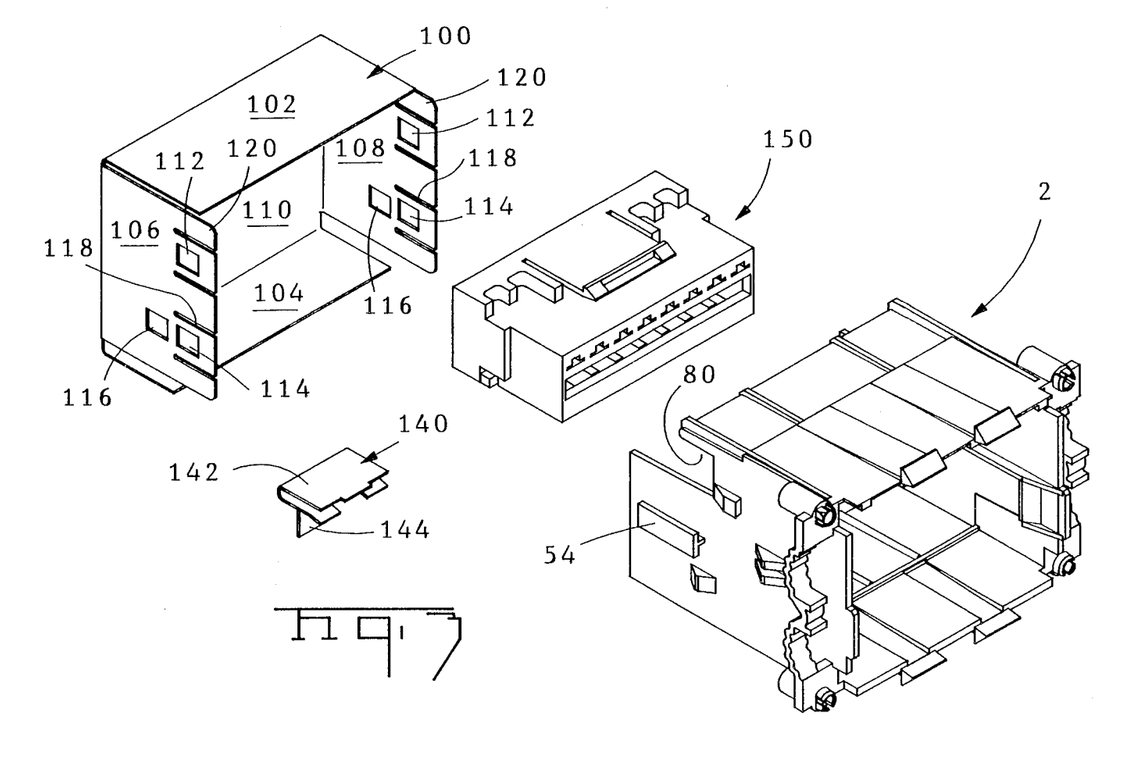
FIG. 6 is a rear plan view of the junction box of the instant invention.
Figure 7:
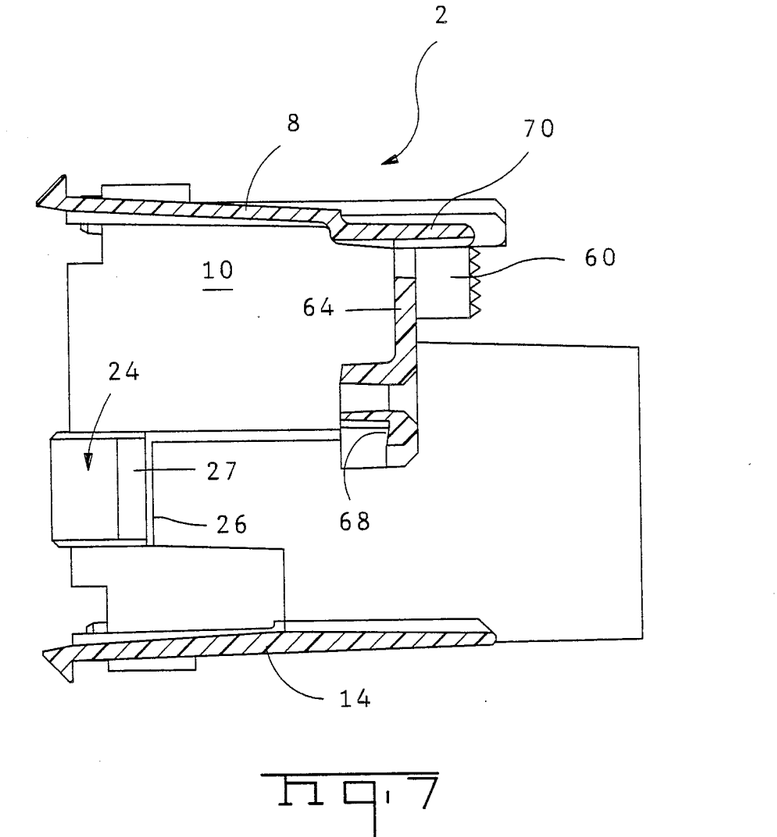
FIG. 7 is a cross-sectional view through lines 7—7 of FIG. 5.

With reference now to FIG. 3, the shielded assembly further comprises a rear shield member 100 comprising upper and lower walls 102, 104, and sidewalls 106 and 108. The upper and lower walls and sidewalls are integrally formed with a back shield wall 110. The shield sidewalls and 108 comprise openings 112, 114 and 116 which are used for latching the shield member to the plated junction box 2. The sidewalls 106 and 108 further comprise a slot 18 which cooperates with the T-bar 54 of this plated junction box which prevents the outward movement of the sidewalls 106 and 108. Finally, the shield member 100 comprises upper tab members 120 which can be bent inwardly to received a shielded cable assembly from either side of the junction box 2 and be received into the opening 80 of the junction box 2. A shielding clip 140 used in conjunction with the shielded junction box 2 comprises a U-shaped clip section 142 and an arm 144. As shown in FIGS. 5, 6 and 7, the junction box 2 includes internally thereof, a vertical wall 64 which extends downwardly from the upper wall 8 and between the sidewalls 10 and 12. A forwardly facing latch surface 68 is defined by the horizontal wall 64 as best shown in FIGS. 5 and 7.

Figure 10:
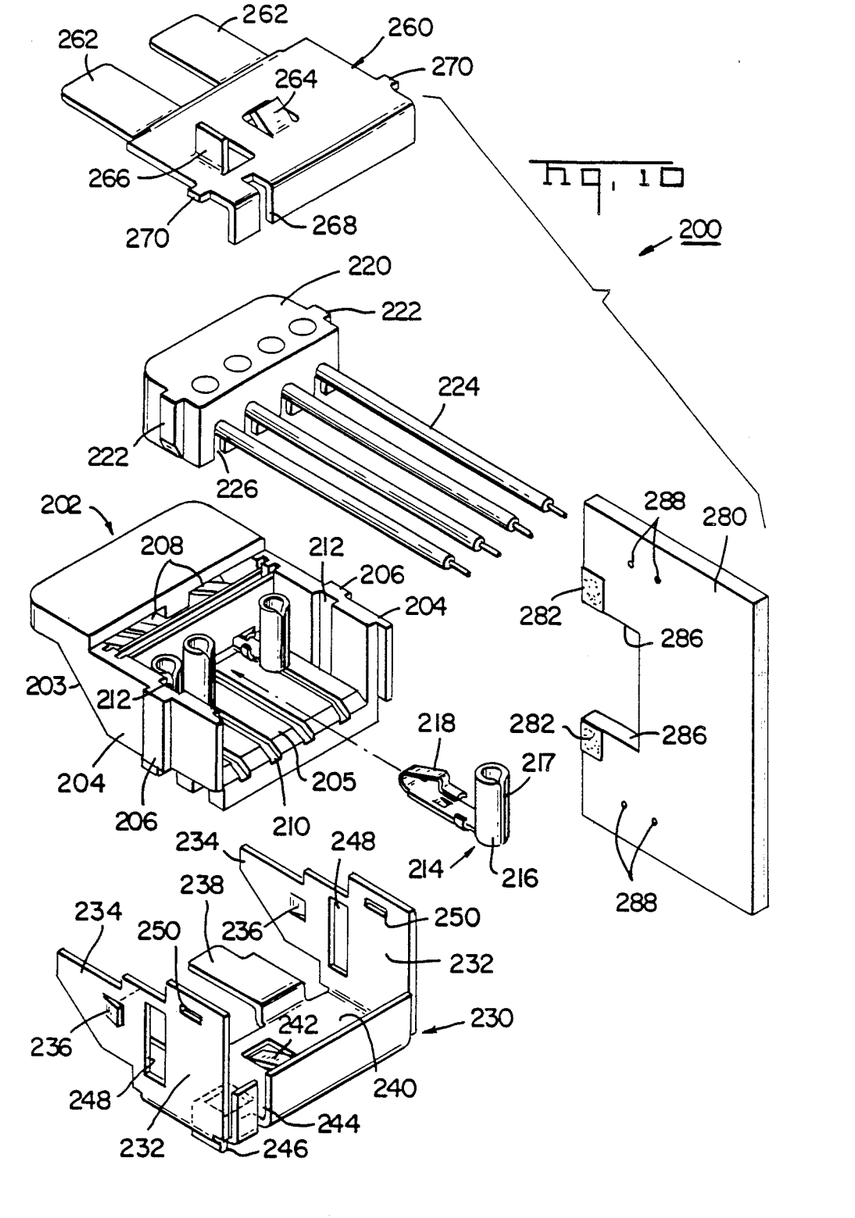
FIG. 10 shows an exploded perspective view of a hermaphroditic data connector.
Figure 11:
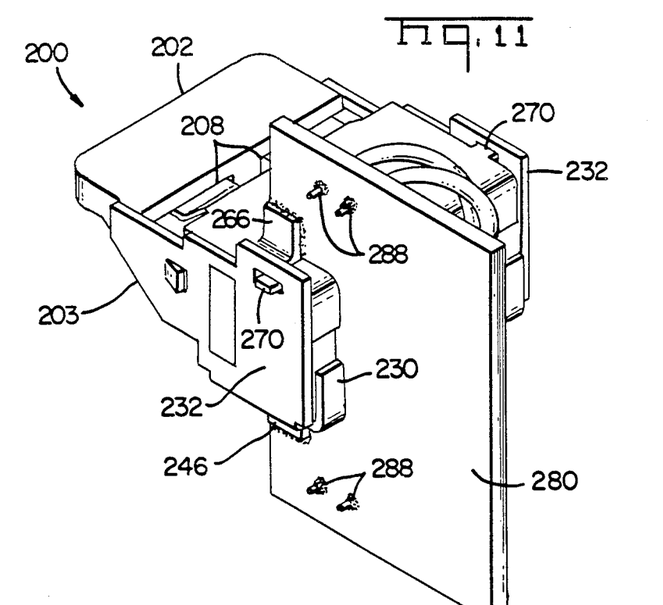
FIG. 11 shows a perspective view of the hermaphroditic electrical connector fully assembled.

Referring next to FIG. 10, the data interface assembly 200 is shown in greater detail. The assembly 200 comprises housing 202, terminals 214, stuffer cap 220, upper and lower shield members 260, 230 and printed circuit board 280. The housing 202, terminals 214 and stuffer cap 220 are similar in design to those disclosed in U.S. Pat. Nos. 4,193,654 and 4,501,459 whose disclosures are incorporated herein by reference.

The insulative housing 202 has a floor 205 and upstanding sidewalls 204, sidewalls 204 extending forwardly defining a mating end 203. Housing 202 also has two shield receiving slots 208 located therein. Located in the floor 205 are terminal receiving slots 210, and located on the outside of the housing 202 as an extension of the sidewalls 204 are ribs 206. Disposed along the internal surface of sidewalls 204 and generally laterally aligned with ribs 206 are channels 212.

The contact terminal 214 is shown as having a resilient contact portion 218 and an insulation displacement portion the portion 216 having an insulation displacement slot 217. Shown disposed above the housing 202 in FIG. 10 is stuffer cap 220 having alignment ribs 222 and conductor receiving slots 226.

Shown disposed below the housing 202 in FIG. 10 is a lower shielding member 230 comprising a floor member 240 and upstanding sidewalls 232. Extending forwardly from the sidewalls 232 are shielding wing portions 234 having stamped out of the wing portions 234 two locking lances 236. Located in the upstanding sidewalls 232 are two pairs of locking slots 248 and 250. Extending forwardly from the floor 240 are two shielding wing portions 238 and stamped from the floor portion 240 is a locking lance 242 and a printed circuit board mounting tab 246. A lower shielding portion 230 further includes a printed circuit board receiving slot 244.

Shown disposed above the stuffer cap 220 in FIG. 10 is an upper shielding portion 260, the shielding portion 260 having forwardly extending shielding wings 262. Extending outwardly from the side edges of the shielding member are two locking tabs 270. Stamped from the shielding member 260 are locking lance 264 and printed circuit board mounting tab 266. On the forward portion of the upper shield member 260 is located a printed circuit board receiving slot 268.

Also shown in FIG. 10 is a printed circuit board 280 having mounting tabs 282, wire receiving holes 288 and a recessed portion 286. Printed circuit board 280 also includes printed circuit traces 284 (FIG. 12) disposed thereon.

Figure 12:
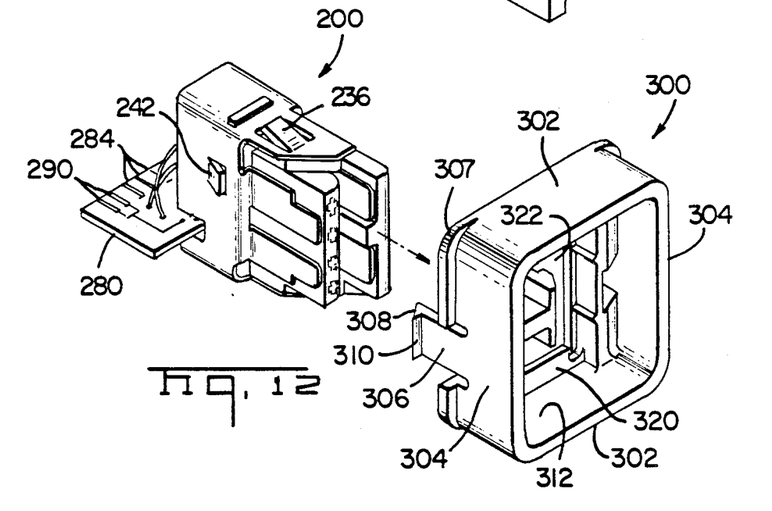
FIG. 12 shows a perspective view of the hermaphroditic electrical connector ready for insertion in a respective adapter insert.
Figure 14:
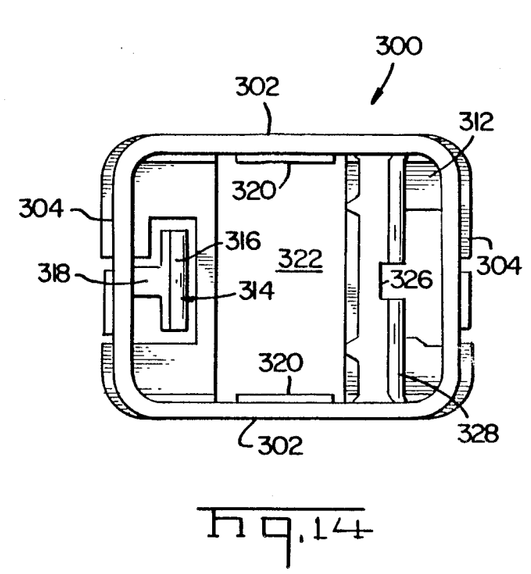
FIG. 14 is a front plan view of the shielded date interface assembly adapter insert.
Figure 15:
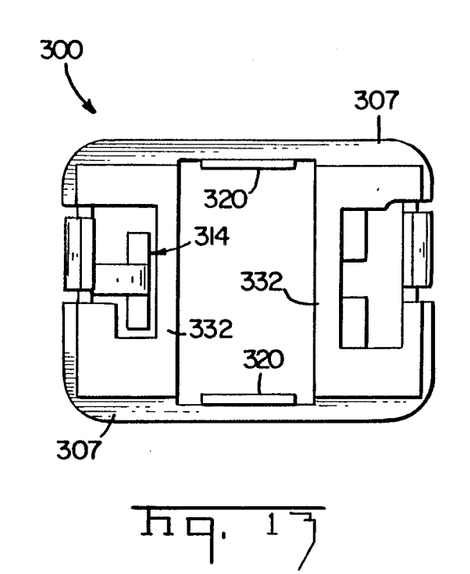
FIG. 15 shows a cross-sectional view through the shielded data interface assembly showing the locking lances on the data interface assembly in a locked configuration with an adapter insert.

Referring now to FIGS. 12, 13 and 14, there is shown in greater detail the date interface assembly adapter insert 300. The adapter 300 comprises sidewalls 304 and endwalls 302. Extending forwardly from the sidewalls 304 are two locking latches 306 comprising a lead in section 308 and a back latching surface 310 (FIG. 12). Although adapter 300 is molded from a plastic material, the complete interior portion of the adapter is plated with a conductive material 312 for shielding purposes. Referring more specifically to FIG. 14, on the interior of endwalls 302 there is located two locking shoulders 320 extending from the interior of the endwalls 302. Extending from the interior of one of the sidewalls 304 is a T-bar 314 having a leg portion 318 and a lead in surface 316. Opposed from the T-bar 314 is a T-slot 326 having a lead in surface 328 and a back wall 330 (FIG. 15). Defined by the sidewalls and the interior surfaces of the adapter 300 is a data interface assembly receiving area 322.

Figures 8, 9:
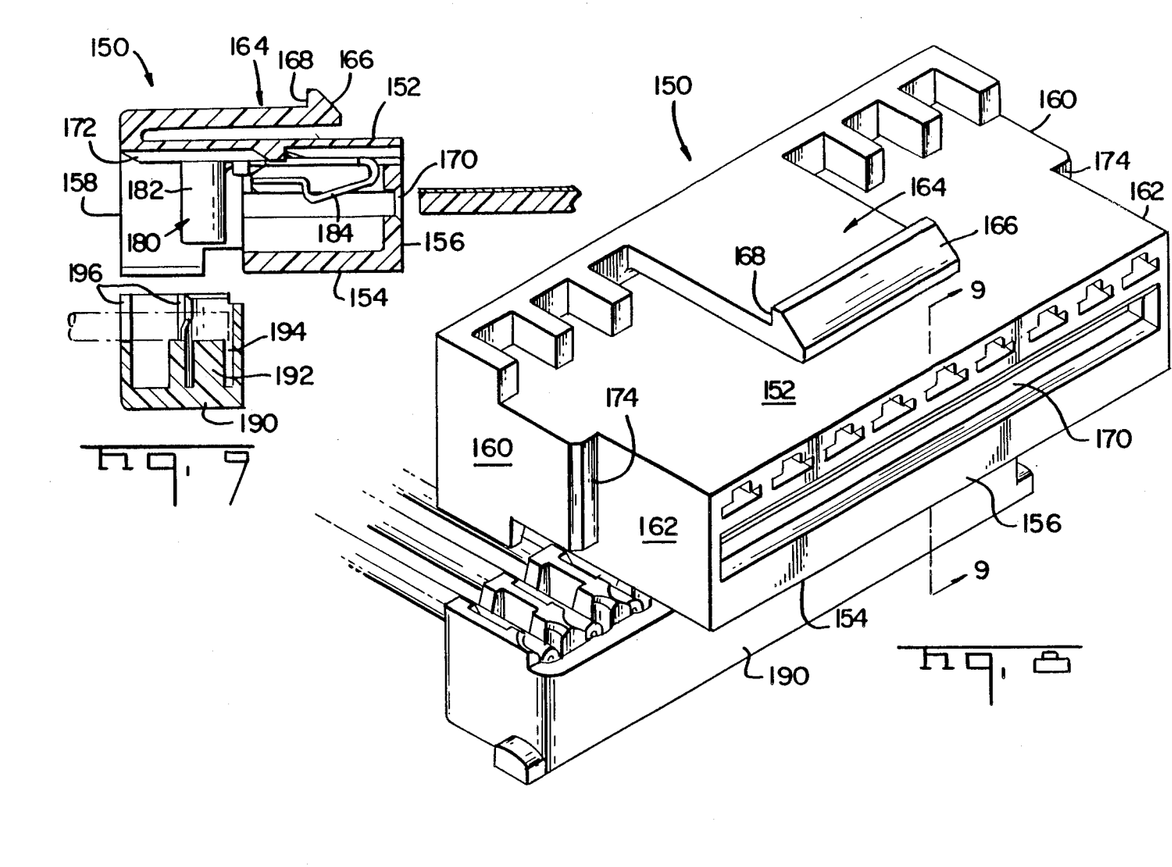
FIG. 8 shows a perspective view of a conductor to card edge interconnection device.
FIG. 9 shows a cross-section of the conductor to card edge connector through lines 9—9 of FIG. 8.

Referring now to FIGS. 8 and 9, there is shown in detail the card edge connector 150 which is similar in design to that disclosed in U.S. Pat. No. 3,860,318, whose disclosure is incorporated herein by reference. A connector 150 comprises top edge 152, bottom edge 154, sidewalls 160, shoulders 174, recessed sidewalls 162 and a back wall 158. Extending inwardly from the back wall 158 are terminal receiving slots 172 for receiving contact terminals 180. Contact terminals 180 comprise a barrel type insulation displacement terminal 182 and a resilient contact portion 184. Also shown in FIG. 9 is a stuffer cap 190 which has a stuffer post 192 with a surrounding circular aperture 194. The outer diameter of the stuffer post 192 is smaller than the inside diameter of the barrel insulation displacement section 182. The stuffer cap 190 further includes wire receiving slots 196. Referring again to FIG. 8, card edge connector 150 includes a latch 164 extending from the back wall 158 and disposed above the top wall 152. The latch 164 comprises a lead in section 166 with a latching back surface 168.

In order to interconnect a shielded cable 130, it is first necessary to assemble the shielded data interface assembly 200. Referring to FIG. 10, the housing 202 must first have the terminals 214 installed therein. The side edges of the terminals 214 being received in the terminal grooves 210 in the floor 205. When the terminals 14 are fully installed, the resilient contact portion 218 is disposed in the forward mating end 203. The individual conductors 214 may then be terminated to the barrel portion of the terminal 216 by placing the individual conductors and their wire receiving slots 226 of the stuffer cap 220. With the four conductors in place, the respective wire receiving slots 226 as shown in FIG. 10, the cap 220 is then lowered onto the housing 202, the locating ribs 222 being disposed in the stuffer cap receiving slots 212 which align stuffer posts (not shown) in the stuffer cap with the barrel terminals 216 which forces the individual conductor 224 into the barrel 216 terminating respective conductors into respective slots 217.

The upper and lower shielding covers 260, 230 are then installed over the housing 202 completely shielding the contact terminals 214. The lower cover 230 is first placed over the lower portion of the housing, the mounting lugs 206 fitting into the mounting slots 248 on the sidewalls 232. The upper shield 260 may then be installed over the housing 202, the shielding wings 262 being placed into the receiving slots 208 and the locking tabs 270 being placed in the mounting slots 250. The edge card is then connected to the shielding members, the cut out portion 286 of the edge card 280 sliding over the upper and lower shield members 260, 230 and sliding into slots 268 and 244 of upper and lower shield 260, 230 respectively. This places the edge card mounting tabs 282 in alignment with mounting tabs 266 and 246 of the shielding members. The tabs 282 are then soldered to the mounting tabs 266, 246 to mechanically mount the edge card 280 to the shielding members 230, 260 and to electrically interconnect ground traces 290 on edge card 280 to the shield members 260, 230. The individual conductors 224 may then be soldered in place to solder pads 288 in edge card 280 interconnecting the individual conductors 224 to the traces 284. As finally assembled, the contact resilient portion 218 is electrically interconnected to the conductive traces 284 on the edge card 280 via the contact terminal 214 and the individual conductors 224, and the shielding members 230, 260 are commoned to the grounding traces 290.

The completed data interface assembly 200 may now be installed in a respective data connector adapter 300 as shown in FIG. 12. The data interface assembly 200 is installed into the assembly receiving area 322, the assembly 200 sliding into the receiving area until the mounting tabs 236 latch over the locking shoulders 230 of the adapter 300 which also places the mounting tabs 242 in abutment with the front surfaces 332 (FIG. 13) of the adapter 300. When latching tabs 236 are in their locked position over the shoulders 320, they are also resiliently biased against the interior surface of end walls 302, and as the interior of the adapter 300 is completely plated with plating material 312, the tabs 236, biased against the end walls 302, common the shielding members 230 and 260 to the plating material 312.

The individual conductors of a shielded cable are then terminated to the contact terminals 180 of the edge card connector 150. Each individual conductor would be placed in the wire receiving slot 196 of the stuffer cap 190 (FIG. 9) and would be terminated in the individual insulation displacement barrel 182. With the individual conductors terminated to the contact terminals 180, the edge card connector 150 could be inserted from the rear side of the outlet member 2 through the rear face 6 as shown in FIG. 2. The edge card connector is pushed forwardly into the cavity until the latching surface 168 (FIG. 9) is latched over the forwardly facing latch surface 68 (FIG. 7) in the outlet housing.

In preparation of the shielded data cable, the outer insulation covering the shielding braid should be removed for a portion adjacent to the edge card connector. In this manner a portion of the shielding braid will be exposed and the shielded data cable will be laced through opening 80 (FIG. 2) of the housing member 2. The grounding clip 140 will then be clipped to one of the three ledge areas 72, 74 or 76 and the tab member 144 will urge the shielding braid against the abutment 60 and into contact with the sharp edges thereof as shown in FIG. 7. The outer shield member 100 is now insertable from the backside of the outlet with the slots 118 being insertable through the T-bar member 54 on the outlet member 2 and with opening 112 cooperating with the latching configuration 50 and with the opening 116 cooperating with the latching configuration 46 on the outlet member 2.

As shown in FIGS. 6 and 7, the outlet box is now latchable to a panel P, although the sequence of the installation of the outlet box is not material to the use of the invention. In FIG. 7, the panel P is shown in phantom where the outlet box is attachable to the rear side of the panel P and mountable adjacent to an opening 0 in the panel P. The latch members 46 and the flexible arm members 32 cooperatively assist in mounting the outlet box 20 to the panel, without the use of extraneous hardware. As shown in FIGS. 6 and 7, the latch members 46 are insertable through the opening 0 of the panel P, such that the rearwardly facing surfaces 50 abut the front face of the panel P as shown in FIG. 6. Conveniently, the flexible arms 32, which flank the outlet box 20, are wider than the opening 0 in the panel P and therefore the grounding lugs 34 abut the rear face of the panel P. These surfaces 50 and 34, therefore cooperatively retain the outlet box to the panel.

It should be understood that the distance between the surfaces 50 and 34, when the box is not inserted in the panel P, is less than the thickness of the panel P. In other words, the arms 32 are resilient to accommodate the thickness of the panel P therebetween. Advantageously, due to the inventive method, the arms 32 are resiliently flexible to accommodate a variety of thicknesses of panels, without cracking the plating on the flexible arms 32.

The assembled data interface assembly 200 and adapter 300 may now be installed in through the open front face 4 of the outlet member 2. The printed circuit board 280 first enters the cavity and begins entry into the edge card connector 150. The latch 306 then begins engagement with the latch member 24 and continued insertion of the adapter causes the lead in sections 308 of the adapter 300 to ride up on the ramp 27 of the latch 24 until the latch back surface 310 is adjacent to and behind shoulder 26 of the outlet box 2 as shown in FIG. 2.

Figure 17:
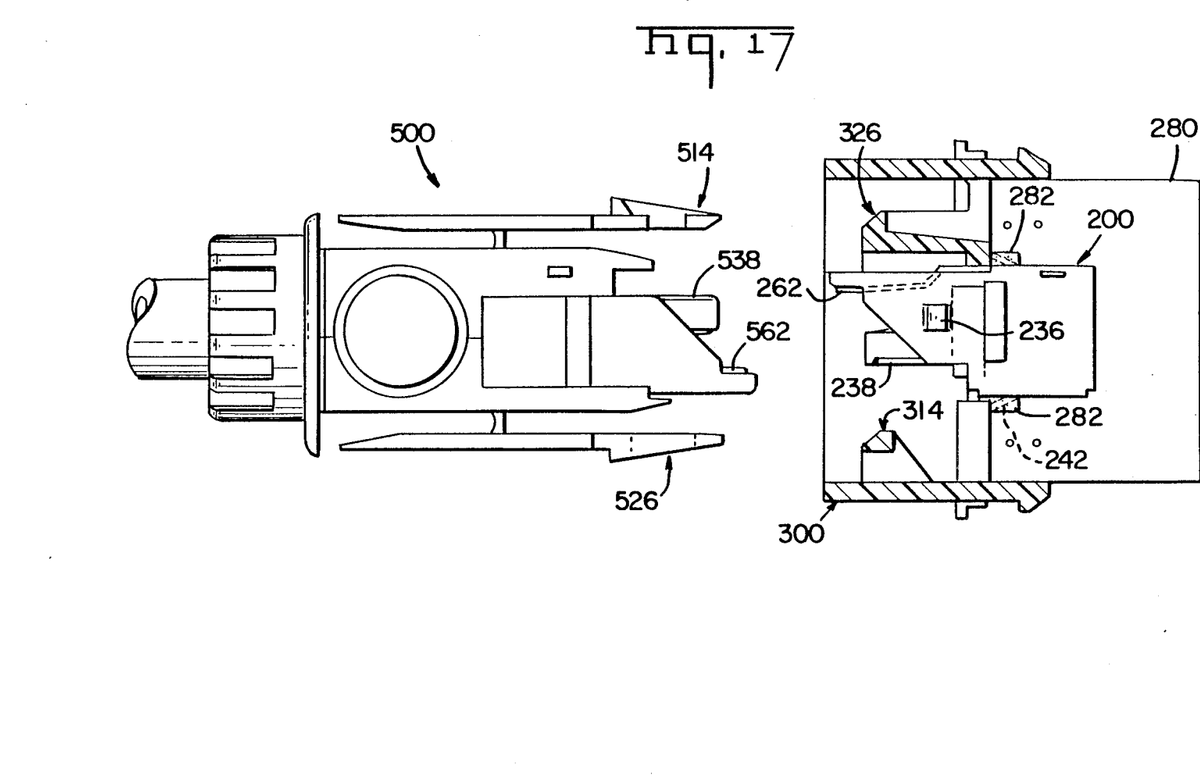
FIG. 17 shows a cross-sectional view of the data interface assembly inserted in a respective adapter insert ready for interconnection with the mating hermaphroditic electrical connector.

The face plate may now be placed over the wall box 2 such that the face plate opening 402 is slideably received over the adapter 300 and is now ready for reception of a date interface interconnector of the type disclosed in U.S. Pat. No. 4,501,459. As shown in FIG. 17 a hermaphroditic data connector 500 when interconnected to data interface assembly 200 interconnects like terminals in connector 500 with terminals 14, and commons like shielding wings with shielding wings 538 and shielding wings 262. When the data connector 500 is inserted, the T-bar overlaps the T-slot 326 and likewise the T-slot of the date connector 500 overlaps the T-slot 314.

Figure 16:
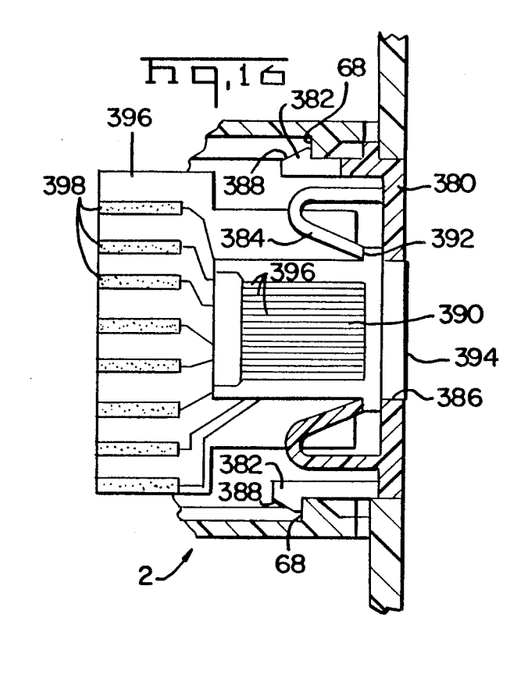
FIG. 16 shows a cross-sectional view through an alternate connection system having a modular jack adapter insert showing the locking lances locking the modular jack to the adapter insert.

In the event that an unshielded data network is utilized, a modular jack assembly as shown in FIG. 16 can be used such as modular jack 390. Modular jack 390 is similar in design to those disclosed in U.S. Pat. No. 4,210,376; 4,221,458; 4,231,628 and 4,292,736, whose disclosure is incorporated herein by reference. The modular jack 390 has a plug receiving opening 394 on the forward surface of the modular jack 390, and further comprises a locking shoulder 392 in stamped and formed contact 396. The modular jack adapter 380 comprises latch members 382, modular jack latch members 384 and modular plug opening 386. The modular jack assembly would be insertable into the outlet box 2 in a similar nature as the data connector. Although the rear shield 100 may not be required in this case.

We claim:

1. A local area network outlet receptacle assembly comprising:
   an outlet means having at least one open compartment for receiving therein a connector for the network, the outlet means being a metallic plated dielectric material having integral latching means having a latching surface facing in a first direction, and an integral and at least one flexible plated grounding arm having a grounding surface which faces in the opposite direction as the first direction, whereby;
   when the outlet means is located in a panel through hole, the panel is trapped between the latching surface and the grounding surface, and the outlet means is grounded to the panel.

2. The local area network receptacle assembly of claim 1 wherein two grounding arms extend from of the outlet means.

3. The local area network receptacle assembly of claim 2 wherein the grounding arms are bow shaped with the grounding surface mounted intermediate the bow.

4. The local area network receptacle assembly of claim 3 wherein the front and rear surfaces of the grounding arms are molded with a sinuous shape which allows the grounding arms to flex forwardly and rearwardly, yet prevents cracking of the metallic plating.

5. A local area network receptacle assembly for shielded electrical data cable, comprising:
   a shielded connector assembly having a dielectric housing with a plurality of electrical terminals mounted therein, and a shield member surrounding the housing, the connector having an edge card mounted to the housing and having traces on the edge card electrically connected to the electrical terminals in the connector;
   an edge card connector having electrical terminals mounted therein having rear wire terminating sections and forward terminals for connection with the traces of the edge card;
   an outlet member having at least one opening for receiving from the front thereof, the shielded connector assembly, and from the rear, the edge card connector, the outlet member having a rear ledge extending from the housing, beneath which is located a cable receiving opening, and at least one grounding lug integrally molded with the outlet member adjacent to the cable receiving opening; and
   a grounding clip which mounts to the ledge of the outlet member and urges a shielded braid of a shielded cable into the grounding lug to common the shielding braid to the outlet member.

6. The local area network assembly of claim 5 wherein the grounding clip comprises a U-shaped clip which mounts to the rear ledge, and a tab extending from the clip which urges the shielding braid into the grounding lug.

7. The local area network assembly of claim 5 wherein the outlet member comprises integral latching means having a latching surface facing in a first direction, and at least one flexible plated grounding arm having a grounding surface which faces in the opposite direction as the first direction, whereby;
   when the outlet means is located in a panel through hole, the panel is trapped between the latching surface and the grounding surface, and the outlet means is grounded to the panel.

* * * * *